US012133997B1

(12) United States Patent
Wilke

(10) Patent No.: US 12,133,997 B1
(45) Date of Patent: Nov. 5, 2024

(54) RESPIRATOR MASK FILTER ADAPTER

(71) Applicant: U.S. Army Combat Capabilities Development Command, Chemical Biological Center, APG, MD (US)

(72) Inventor: Douglas E Wilke, Joppa, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 734 days.

(21) Appl. No.: 17/466,714

(22) Filed: Sep. 3, 2021

(51) Int. Cl.
*A62B 23/02* (2006.01)
*A62B 9/04* (2006.01)

(52) U.S. Cl.
CPC ................ *A62B 23/02* (2013.01); *A62B 9/04* (2013.01)

(58) Field of Classification Search
CPC ............ A62B 18/02–045; A62B 18/08; A62B 18/088; A62B 18/10; A62B 9/04; A62B 23/00–06
See application file for complete search history.

(56) References Cited

U.S. PATENT DOCUMENTS

2003/0192536 A1* 10/2003 Odell .................. A62B 17/006 128/202.19

FOREIGN PATENT DOCUMENTS

JP 2019514610 A * 6/2019

OTHER PUBLICATIONS

JP 2019514610 A description translation accessed Sep. 12, 2024 (Year: 2019).*

* cited by examiner

*Primary Examiner* — Margaret M Luarca
*Assistant Examiner* — Kira B Daher
(74) *Attorney, Agent, or Firm* — Ulysses John Biffoni

(57) ABSTRACT

A filter adaptor is provided for a respirator that allows the respirator to accommodate filters that have a different connection interface than the filter connection on the respirator. The adaptor includes a body having a first surface and an opposite second surface and defines a through hole. Mask locking tabs on the first surface engage with a complementary bayonet attachment the respirator. A first wall on the first surface and an inlet port gasket thereon nests within a complementary inlet port on the respirator to form an air-tight seal between the first wall and the inlet port. A valve ring on the first surface of the body engages an inlet valve on the respirator. A second wall on the second surface includes filter locking tabs that engage with a complementary filter opening of a filter. A filter gasket around the second wall forms an air-tight seal between the filter opening and the adaptor.

20 Claims, 3 Drawing Sheets

RESPIRATOR MASK FILTER ADAPTER

GOVERNMENT INTEREST

The invention described herein may be manufactured, used, and/or licensed by or for the United States Government.

FIELD OF THE INVENTION

The present invention relates to the technical field of respirator masks, and in particular to an adaptor for U.S. military M50 Joint Service General Purpose Masks (JSGPM) to allow such existing masks to accept commercially available standard particulate filters.

BACKGROUND OF THE INVENTION

The Joint Service General Purpose Mask (JSGPM) is a family of above-the-neck, chemical, biological, radiological, and nuclear (CBRN) respirators that protects against battlefield concentrations of CBRN agents, toxins, toxic industrial materials, and radioactive particulate matter. The family consists of the M50 (ground use), M51 (ground vehicle use), M53 (Special Forces) and M53A1 (domestic and military use).

The M50 JSGPM is a full face piece respirator which provides oral, nasal, and ocular protection from chemical and biological agents. M50 masks utilize filters with unique, nonstandard connections to the face piece. While these nonstandard filters offer some unique capabilities compared to standardized filters, they are expensive and excessive for protecting against airborne transmitted respiratory illnesses such as COVID-19. However, given that large portions of the warfighter population already possess the M50 mask and that the global COVID-19 pandemic and its potential mutations continues, there is a need for a cost effective means for protecting the warfighter against COVID-19 as it is today, any future mutations, and other similar airborne transmitted viruses.

Thus, there is a need for an adapter that allows widely utilized military M50 Joint Service General Purpose Masks (JSGPM) to accept commercially available standard particulate filters.

SUMMARY OF THE INVENTION

The present invention provides a filter adaptor for a respirator to allow the respirator to accept and accommodate filters that have a different connection interface than the filter connection on the respirator. The present invention is particularly useful as a filter adapter for military M50 Joint Service General Purpose Masks (JSGPM), which have a unique, non-standard filter connection. The inventive filter adapter allows the M50 respirator to utilize commercial N95 or P100 filters, such as those sold by 3M Company®. The adaptor includes a body having a first surface and an opposite second surface and defines a through hole that extends from the first surface to the second surface. A plurality of mask locking tabs project from the first surface of the body to engage with a complementary bayonet attachment on a mask facepiece of the respirator. A first wall projects from the first surface of the body and is configured to nest within a complementary inlet port on the mask facepiece of the respirator. An inlet port gasket is positioned on an outer surface of the first wall and is configured to form an air-tight seal between the first wall and the complementary inlet port on the mask facepiece of the respirator. A valve ring projects from the first surface of the body and is configured to engage an inlet valve on the mask facepiece of the respirator. A second wall projects from the second surface of the body and includes a plurality of filter locking tabs that project from an outer surface of the second wall. The plurality of filter locking tabs are configured to engage with a complementary filter opening of a filter. A filter gasket positioned on the second surface about the outer surface of the second wall is configured to form an air-tight seal between the filter opening and the adaptor.

BRIEF DESCRIPTION OF THE DRAWINGS

The present invention is further detailed with respect to the following figures that depict various aspects of the present invention.

DETAILED DESCRIPTION OF THE PREFERRED EMBODIMENTS

Figure 1:
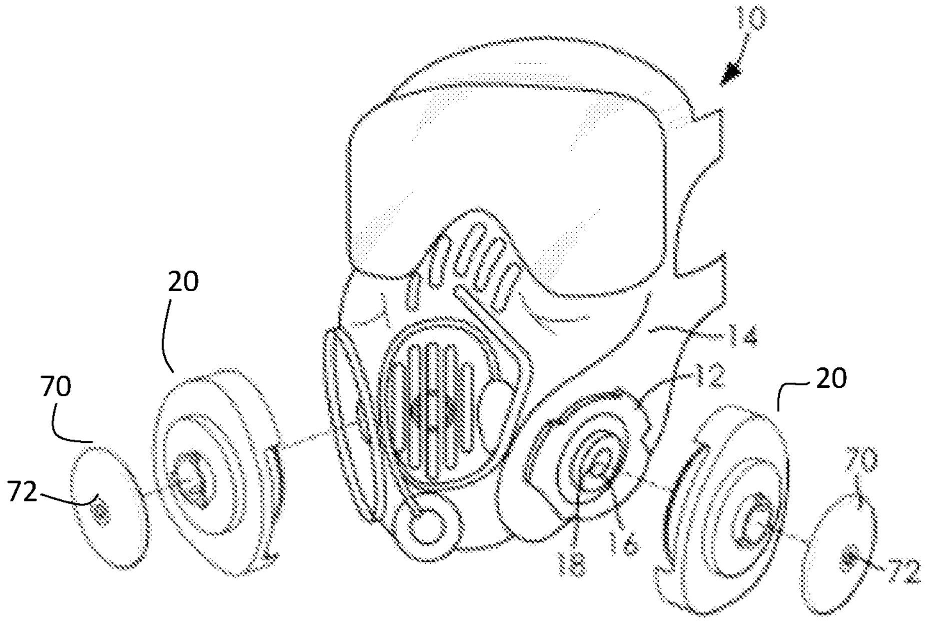
FIG. 1 is an exploded view of an adaptor according to embodiments of the present invention used with a respirator and a filter.

The present invention has utility as a filter adaptor for a respirator to allow the respirator to accept and accommodate filters that have a different connection interface than the existing filter connection on the respirator. The present invention is particularly useful as a filter adapter for the U.S. military M50 Joint Service General Purpose Masks (JSGPM), which have a unique, non-standard filter connection. The inventive filter adapter allows the M50 respirator to utilize commercial N95 or P100 filters, such as those sold by 3M Company. Accordingly, existing respirator masks that are already in the possession of large portions of the warfighter population may be easily and cost effectively retrofitted to utilize less expensive particulate filters for protection against airborne pathogens and viruses.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below. As used in the description of the invention and the appended claims, the singular forms "a." "an" and "the" are intended to include the plural forms as well, unless the context clearly indicates otherwise. Also as used herein, "and/or" refers to and encompasses any and all possible combinations of one or more of the associated listed items, as well as the lack of combinations when interpreted in the alternative ("or").

Referring now to the drawings, a filter adaptor 20 for a respirator 10 includes a body 22 that has a first surface 24 and an opposite second surface 26. The body 22 defines a through hole 28 that extends from the first surface 24 to the second surface 26. According to embodiments, the through hole 28 is positioned in the center of the body 22. According to embodiments, the first surface 24 and the second surface 26 are planar. According to embodiments, the first surface and the second surface are parallel to one another. According to embodiments, the body 22 has an outer perimeter that is egg-shaped.

Figure 2:
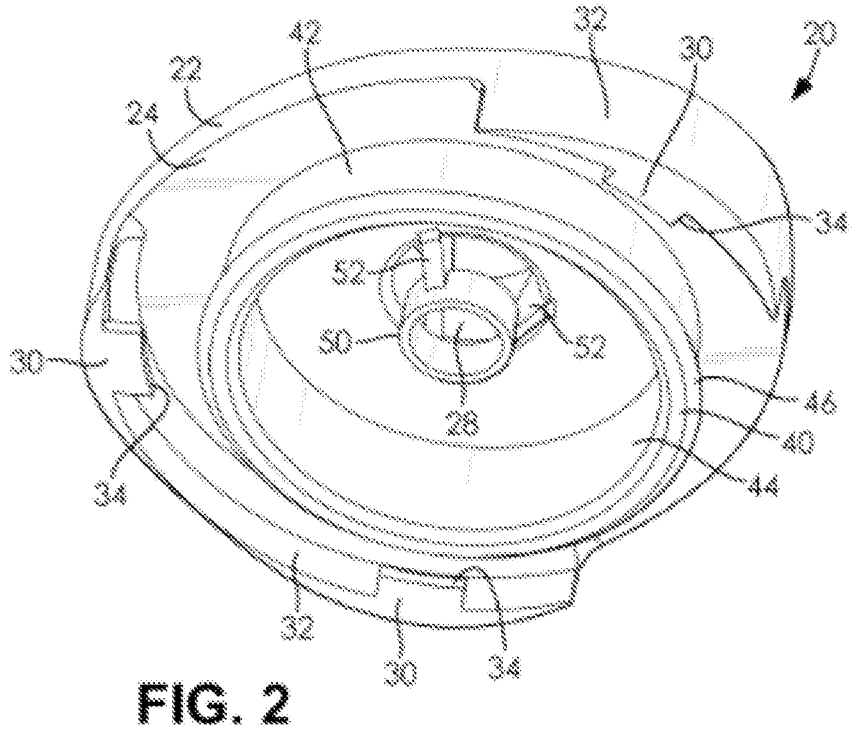
FIG. 2 is a bottom perspective view of an adaptor according to embodiments of the present invention.
Figure 3:
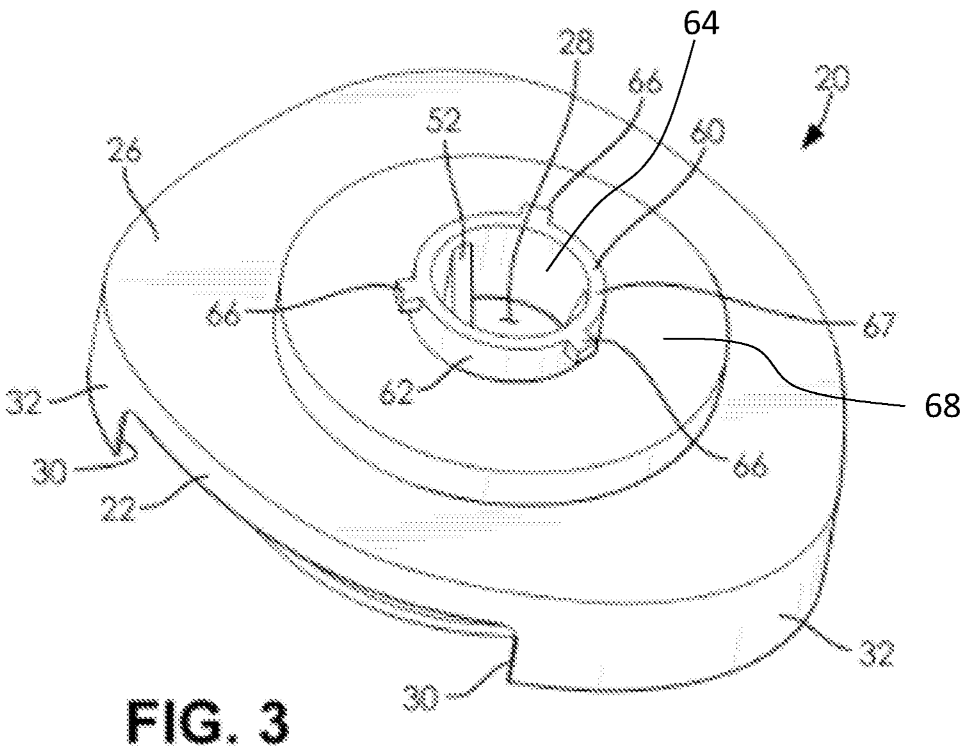
FIG. 3 is a top perspective view of an adaptor according to embodiments of the present invention.

The filter adaptor 20 additionally includes a plurality of mask locking tabs 30 that project from the first surface 24 of the body 22. The plurality of mask locking tabs 30 are configured to engage with a complementary bayonet attachment 12 on a mask facepiece 14 of the respirator 10, thereby releasably locking the filter adaptor 20 to the complementary bayonet attachment 12 on a mask facepiece 14 of the respirator 10. According to embodiments, the mask locking tabs 30 are positioned near the outer perimeter of the body 22. As shown in FIG. 2, the plurality of mask locking tabs 30 each include a wall portion 32 which separate the ends 34 of the mask locking tabs 30 from the first surface 24. According to embodiments, the wall portions 32 of the mask locking tabs 30 are spaced apart from one another, while according to further embodiments, the wall portions 32 may be continuous such that the wall portions 32 form a continuous wall that encircles the first surface 24 of the body 22 or joins at least two of the locking tabs 30 together. According to embodiments, the mask locking tabs 30 project from the wall portions 32 toward the through hole 28 defined in the body 22. According to embodiments, the wall portions 32 project perpendicularly from the first surface 24 of the body. According to embodiments, the ends 34 of the mask locking tabs 30 project perpendicularly from the wall portions 32.

Figure 4:
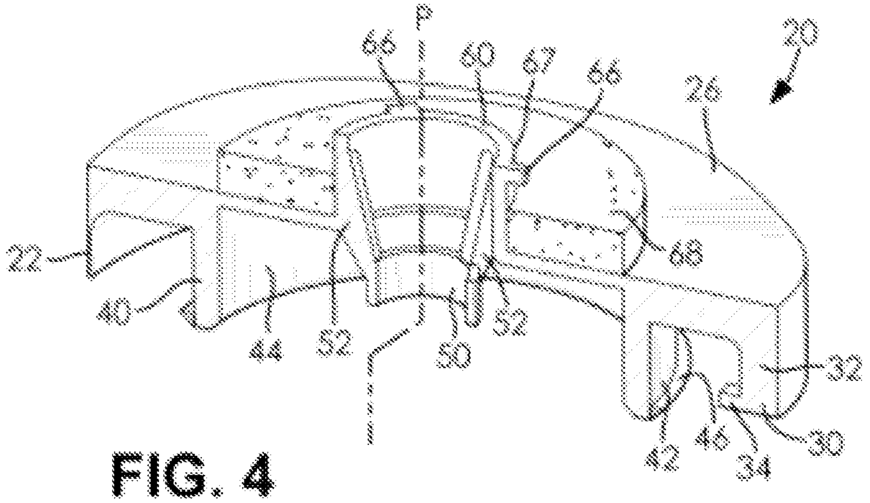
FIG. 4 is a cross sectional view of the adaptor of FIG. 3.
Figure 5:
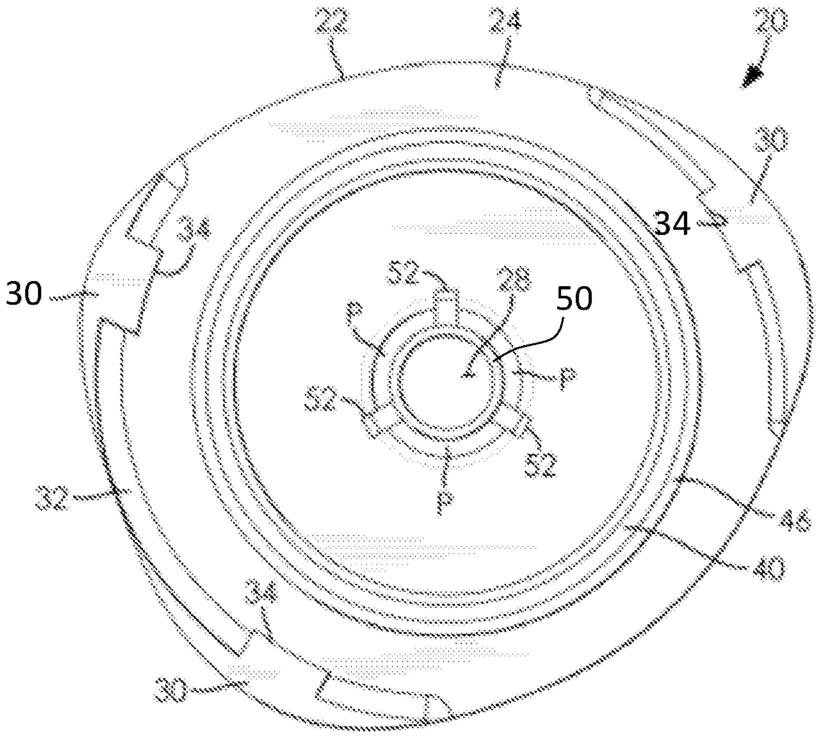
FIG. 5 is a bottom view of an adaptor according to embodiments of the present invention.
Figure 6:
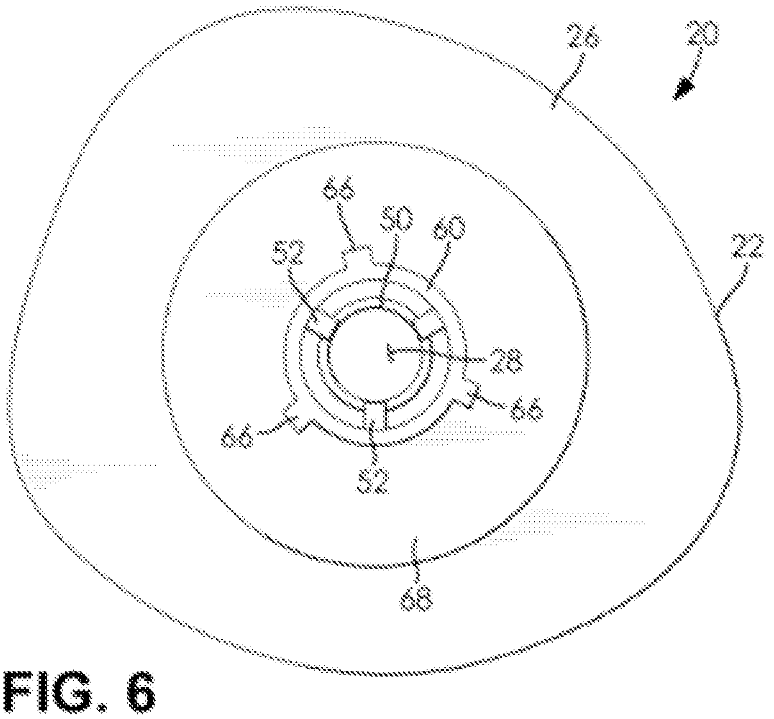
FIG. 6 is a top view of the adaptor of FIG. 5.

The filter adaptor 20 additionally includes a first wall 40 that projects from the first surface 24 of the body 22. The first wall 40 is configured to nest within a complementary inlet port 16 on the mask facepiece 14 of the respirator 10. As shown in FIGS. 2 and 4, the first wall 40 is positioned between the mask locking tabs 30 and the through hole 28 defined in the body 22. The first wall 40 includes an outer surface 42 that faces the perimeter of the body 22 and an inner surface 44 the faces the through hole 28 defined in the body 22. According to embodiments, the first wall 40 surrounds the through hole 28 defined in the body 22. According to embodiments, the first wall 40 is circular. According to embodiments, the first wall 40 is coaxial with the through hole defined in the body 22.

The filter adaptor 20 additionally includes an inlet port gasket 46. The inlet port gasket 46 is positioned on an outer surface 42 of the first wall 40. The inlet port gasket 46 is configured to form an air-tight seal between the first wall 40 and the complementary inlet port 16 on the mask facepiece 14 of the respirator 10 when the first wall 40 is in its nested positioned within the complementary inlet port 16 on the mask facepiece 14 of the respirator 10. According to embodiments, the inlet port gasket 46 is an O-ring that encircles the outer surface 42 of the first wall 40. According to embodiments, the inlet port gasket 46 is formed of a rubber or elastomeric material. According to embodiments, the inlet port gasket 46 is attached to the outer surface 42 of the first wall 40, for example by an adhesive. According to embodiments, the inlet port gasket 46 is positioned within a channel defined in the outer surface 42 of the first wall 40, which is configured to hold the inlet port gasket 46 in position relative to the first wall 40.

The filter adaptor 20 additionally includes a valve ring 50. The valve ring 50 projects from the first surface 24 of the body 22 and is configured to engage an inlet valve 18 on the mask facepiece 14 of the respirator 10. The engagement of the valve ring 50 and the inlet valve 18 opens an air pathway P from outside to inside the mask, as shown by the arrow line in FIG. 4. According to embodiments, the valve ring 50 includes a plurality of supporting arms 52 that project from the first surface 24 of the body 22 and hold the valve ring 50 in a positioned separated from the first surface 24 of the body 22. As shown in FIG. 4, there are open spaces between the supporting arms 52, the valve ring 50, and the first surface 24 through which the air pathway P is defined. According to embodiments, the valve ring 50 is coaxial with the through hole 28 defined in the body 22.

The filter adaptor 20 additionally includes a second wall 60 that projects from the second surface 26 of the body 22. The second wall 60 has an outer surface 62 and an inner surface 64. According to embodiments, the second wall 60 surrounds the through hole 28 defined in the body 22, the inner surface 64 defining the through hole 28. According to embodiments, the second wall 60 is circular. According to embodiments, the second wall 60 is coaxial with the through hole 28 defined in the body 22. A plurality of filter locking tabs 66 project from the outer surface 62 of the second wall 60. The plurality of filter locking tabs 66 are configured to engage with a complementary filter opening 72 of a filter 70 to lock the filter 70 to the adaptor 20. According to embodiments, the filter locking tabs 66 project from the outer surface 62 of the second wall 60 in a direction away from the through hole 28 defined in the body 22. According to embodiments, the plurality of filter locking tabs 66 are positioned at the end 67 of the second wall 60.

The filter adaptor 20 additionally includes a filter gasket 68 that is positioned on the second surface 26 of the body 22. The filter gasket 68 is positioned about the outer surface 62 of the second wall 60. The filter gasket 68 is configured to form an air-tight seal between the filter opening 72 and the adaptor 20. According to embodiments, the filter gasket 68 is formed of a closed cell foam.

The filter adapter 20 is installed on a military M50 Joint Service General Purpose Masks (JSGPM) by aligning the mask locking tabs 30 of the adaptor 20 with the bayonet attachment 12 on the mask facepiece 14 of the respirator 10, pushing the adaptor 20 towards the mask facepiece 14 of the respirator 10, and twisting the adaptor 20 relative to the bayonet attachment 12 on the mask facepiece 14 of the respirator 10. Pushing the adaptor 20 towards the mask facepiece 14 of the respirator 10 causes the first wall 40 to nest within a complementary inlet port 16 on the mask facepiece 14 of the respirator 10 and the inlet port gasket 46 positioned on an outer surface 42 of the first wall 40 to form an air-tight seal between the first wall 40 and the complementary inlet port 16 on the mask facepiece 14 of the respirator 10. Additionally, when the adaptor 20 is pushed towards the mask facepiece 14 of the respirator 10, the ring valve 50 engages with the inlet valve 18 on the mask facepiece 14 of the respirator 10, which opens an air pathway from outside to inside the mask. Twisting the adaptor 20 relative to the bayonet attachment 12 on the mask facepiece 14 of the respirator 10 causes the mask locking tabs to lock with the corresponding catches of the bayonet attachment 12 on the mask facepiece 14 of the respirator 10, thereby locking the adaptor 20 to the respirator 10.

The inventive filter adapter 20 allows the respirator 10 to utilize commercial N95 or P100 filters 70, such as those sold by 3M Company. To install such a commercial filter 70 to the adaptor 20, the filter opening 72 is aligned with the second wall 60 on the second surface 26 of the adaptor body 22. The filter opening 72 is inserted around the filter locking tabs 66 and the filter 70 is rotated relative to the adaptor 20, thereby causing the filter locking tabs 66 to lock with corresponding tabs in the filter opening 72 and locking the filter 70 to the adaptor 20. Locking the filter 70 to the adaptor 20 causes the filter 70 to compress the filter opening 72 against the filter gasket 68, thereby creating an air-tight seal between the filter 70 and the adaptor 20. The result is an air-tight sealed air pathway from the filter 70 to the inside of the respirator 10.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A filter adaptor for a respirator, the adaptor comprising:

a body having a first surface and an opposite second surface and defining a through hole that extends from the first surface to the second surface;

a plurality of mask locking tabs that project from the first surface of the body, the plurality of mask locking tabs configured to engage with a complementary bayonet attachment on a mask facepiece of the respirator;

a first wall that projects from the first surface of the body, the first wall configured to nest within a complementary inlet port on the mask facepiece of the respirator;

an inlet port gasket positioned on an outer surface of the first wall, the inlet port gasket configured to form an air-tight seal between the first wall and the complementary inlet port on the mask facepiece of the respirator;

a valve ring that projects from the first surface of the body; the valve ring configured to engage an inlet valve on the mask facepiece of the respirator;

a second wall that projects from the second surface of the body;

a plurality of filter locking tabs that project from an outer surface of the second wall, the plurality of filter locking tabs configured to engage with a complementary filter opening of a filter;

a filter gasket positioned on the second surface of the body about the outer surface of the second wall, the filter gasket configured to form an airtight seal between the filter opening and the adaptor.

2. The filter adaptor of claim 1, wherein the first surface of the body is planar.

3. The filter adaptor of claim 1, wherein the second surface of the body is planar.

4. The filter adaptor of claim 1, wherein the first surface of the body is parallel to the second surface of the body.

5. The filter adaptor of claim 1, wherein the body has an outer perimeter that is egg-shaped.

6. The filter adaptor of claim 1, wherein the through hole is positioned at a center of the body.

7. The filter adaptor of claim 1, wherein the plurality of mask locking tabs project from a plurality of wall portions that project from the first surface of the body.

8. The filter adaptor of claim 1 wherein the plurality of mask locking tabs project toward the through hole defined in the body.

9. The filter adaptor of claim 1, wherein the first wall surrounds the through hole defined in the body.

10. The filter adaptor of claim 1, wherein the first wall is coaxial with the through hole defined in the body.

11. The filter adaptor of claim 1, wherein the inlet port gasket is formed of a rubber or elastomeric material.

12. The filter adaptor of claim 1, wherein the inlet port gasket is attached to the outer surface of the first wall.

13. The filter adaptor of claim 1, wherein the valve ring includes a plurality of supporting arms that project from the first surface of the body and hold the valve ring in a positioned separated from the first surface of the body.

14. The filter adaptor of claim 1, wherein the valve ring is coaxial with the through hole defined in the body.

15. The filter adaptor of claim 1, wherein the second wall surrounds the through hole defined in the body.

16. The filter adaptor of claim 1, wherein the second wall is coaxial with the through hole defined in the body.

17. The filter adaptor of claim 1, wherein the plurality of filter locking tabs project from the outer surface of the second wall away from the through hole defined in the body.

18. The filter adaptor of claim 1, wherein the plurality of filter locking tabs are positioned at an end of the second wall.

19. The filter adaptor of claim 1, wherein the filter gasket is formed of a closed cell foam.

20. The filter adaptor of claim 1, wherein the respirator is one of an M50 Joint Service General Purpose Mask (JSGPM) and the filter is one of an N95 or P100 filter.

* * * * *